(12) United States Patent
Tsujimoto

(10) Patent No.: US 8,549,408 B2
(45) Date of Patent: Oct. 1, 2013

(54) MULTI-FUNCTIONAL PERIPHERAL AND MULTI-FUNCTIONAL PERIPHERAL CONTROL SYSTEM

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 232 days.

(21) Appl. No.: 13/070,074

(22) Filed: Mar. 23, 2011

(65) Prior Publication Data

US 2011/0239124 A1 Sep. 29, 2011

(30) Foreign Application Priority Data

Mar. 29, 2010 (JP) ................................ 2010-075136

(51) Int. Cl.
*G06F 15/00* (2006.01)
*G06F 13/00* (2006.01)

(52) U.S. Cl.
USPC .......................................... 715/740; 715/734

(58) Field of Classification Search
USPC .................. 715/740–743, 734–738, 850–854
See application file for complete search history.

(56) References Cited

U.S. PATENT DOCUMENTS

| 7,765,275 B2 * | 7/2010 | Crick et al. .................... 709/217 |
| 2009/0195813 A1 * | 8/2009 | Shibaki ........................ 358/1.15 |
| 2011/0078683 A1 * | 3/2011 | Yamamoto et al. ........... 718/100 |

FOREIGN PATENT DOCUMENTS

| JP | 2005-010913 A | 1/2005 |
| JP | 2007-200331 A | 8/2007 |

* cited by examiner

*Primary Examiner* — Cao "Kevin" Nguyen
(74) *Attorney, Agent, or Firm* — Edwards Wildman Palmer LLP; David G. Conlin; Stephen D. LeBarron

(57) ABSTRACT

A multi-functional peripheral 21 according to this invention operates in accordance with a web browser software, and includes: a web browser section 5 configured to store cookie information received from a web server section 53 into a setting information database 6; and an apparatus control section 7 configured to manage the cookie information in accordance with a mode set by a verification mode setting section 13. In a case where the mode set by the verification mode setting section 13 is a user verification inactive mode, the apparatus control section 7 discards the cookie information from the setting information database 6 after operation of the web browser section is terminated.

12 Claims, 6 Drawing Sheets

| .example.com / 01 May 2010 09:10:11 GMT  username  user1 |
| .sharp.co.jp  / 03 May 2010 12:34:56 GMT  uid         sharp1 |

| Cookie: username=user1 |

FIG. 6

```
DOCUMENT MANAGEMENT APPLICATION

LOGIN NAME: [                    ]

PASSWORD:   [                    ]

☑ OMIT ENTRY NEXT TIME ON

[ LOG IN ] [ RESET ]
```

FIG. 7

Set-Cookie: *username=user1*; expires=01 May 2010 09:10:11 GMT;path=/; domain=.example.com

FIG. 8

| USER ID | COOKIE INFORMATION FILE NAME | TERM OF VALIDITY |
|---------|------------------------------|------------------|
| user1   | user1.dat                    | 2010/05/01       |
| user2   | user2.dat                    | 2010/05/20       |
| ...     | ...                          | ...              |

MULTI-FUNCTIONAL PERIPHERAL AND MULTI-FUNCTIONAL PERIPHERAL CONTROL SYSTEM

This Nonprovisional application claims priority under 35 U.S.C. §119(a) on Patent Application No. 2010-075136 filed in Japan on Mar. 29, 2010, the entire contents of which are hereby incorporated by reference.

TECHNICAL FIELD

The present invention relates to a multi-functional peripheral that works in cooperation with an information processing apparatus.

BACKGROUND ART

"HTTP Cookie (hereinafter referred to as cookie information)" is a relatively small piece of text data used by a web server to identify a client when accessing the web.

When a user accesses a website on a web server, cookie information is transmitted from a web server to a web browser used by the user and is stored in a hard disk drive. If the user enters some kind of setting or input while the user browses the website, cookie information indicative of that detail is stored. This cookie information is automatically transmitted from the web browser to the web server when the user accesses the website again with the same web browser. This allows the web server to identify the client (web browser) that is accessing the web server. Accordingly, the cookie information is recently known as playing an important function for providing pleasant web access, such as providing an option of "keeping me signed in".

Meanwhile, in a case where a plurality of users share a multi-functional peripheral that has no verification function for performing user verification at a time when using the peripheral, security risks such as leakage of personal information stored as cookie information may be assumed, which cookie information is stored by a web browser provided in the multi-functional peripheral. In this case, possible measures taken against these security risks are measures such as inactivating the cookie information.

Patent Literature 1 discloses a technique which changes a term of validity of cookie information, as a technique to inactivate cookie information.

CITATION LIST

Patent Literature

Patent Literature 1
Japanese Patent Application Publication, Tokukai, No. 2007-200331 A (Publication Date: Aug. 9, 2007)

SUMMARY OF INVENTION

Technical Problem

However, inactivation of cookie information causes a problem that various applications running on the web server on the premise that the cookie information is active cannot be used while the cookie information is inactive.

Hence, in order to use the applications that run on the premise that the cookie information is active, it is required to activate the cookie information regardless of whether or not the multi-functional peripheral has the verification function. This however accompanies the aforementioned security risk.

Consequently, in such a case, it is preferable that the multi-functional peripheral dynamically change the term of validity of the cookie information in accordance with whether an environment in which the multi-functional peripheral is provided is one which allows safe use of the cookie information.

The present invention is accomplished in view of the conventional problem, and its object is to achieve a multi-functional peripheral which is reduced in security risks such as leakage of personal information.

Solution to Problem

In order to attain the object, a multi-functional peripheral according to the present invention is a multi-functional peripheral communicating with an information processing apparatus over a communications network, the information processing apparatus including a web server section operating in accordance with a web server software, the multi-functional peripheral including: a mode setting section configured to (i) request for an entry of identification information identifying a user, (ii) select a mode of either (a) a user verification active mode allowing the user to use the multi-functional peripheral after the entry of the identification information is received or (b) a user verification inactive mode allowing the user to use the multi-functional peripheral without the entry of the identification information being received, and (iii) cause the mode selected to be executed; a web browser section operating in accordance with a web browser software, configured to store cookie information received from the web server section into a storage section; and a cookie information management section configured to manage the cookie information in accordance with the mode set by the mode setting section, and in a case where the mode set by the mode setting section is the user verification inactive mode, the cookie information management section discarding the cookie information from the storage section after operation of the web browser section is terminated.

According to the configuration, in a case where the user verification inactive mode is selected by the mode setting section, the cookie information management section discards the cookie information from the storage section after operation of the web browser section is terminated. This makes it possible to avoid personal information included in the cookie information from leaking to other users. Consequently, it is possible to achieve a multi-functional peripheral which is reduced in security risks such as leakage of personal information.

Moreover, the web browser section causes the storage section to store the cookie information that is received from the web server section. This makes it possible to use various applications that run on the web server on the premise that the cookie information is active.

Advantageous Effects of Invention

As described above, the multi-functional peripheral according to the present invention is a multi-functional peripheral communicating with an information processing apparatus over a communications network, the information processing apparatus including a web server section operating in accordance with a web server software, the multi-functional peripheral including: a mode setting section configured to (i) request for an entry of identification information identifying a user, (ii) select a mode of either (a) a user verification active mode allowing the user to use the multi-functional peripheral after the entry of the identification information is received or (b) a user verification inactive mode allowing the user to use the multi-functional peripheral without the entry of the identification information being received, and (iii) cause the mode selected to be executed; a web browser section operating in accordance with a web browser software, configured to store the cookie information received from the web server section into a storage section; and a cookie information management section configured to manage the cookie information in accordance with a mode set by the mode setting section, and in a case where the mode set by the mode setting section is the user verification inactive mode, the cookie information management section discarding the cookie information from the storage section after operation of the web browser section is terminated.

Hence, it is possible to attain an effect of providing a multi-functional peripheral which is reduced in security risks such as leakage of personal information.

BRIEF DESCRIPTION OF DRAWINGS

FIG. 6 illustrates one example of an initial operation screen based on HTML data transmitted from an information processing apparatus illustrated in FIG. 1.

FIG. 7 illustrates one example of a set-cookie header transmitted to a multi-functional peripheral from an information processing apparatus according to the present embodiment.

FIG. 8 illustrates a cookie information file management table by user, which is stored in the setting information database illustrated in FIG. 3.

DESCRIPTION OF EMBODIMENTS

Embodiment 1

One embodiment of the present invention is described below, with reference to FIGS. 1 to 8. The following description explains one embodiment of a multi-functional peripheral control system including a multi-functional peripheral according to the present invention.

Figure 1:
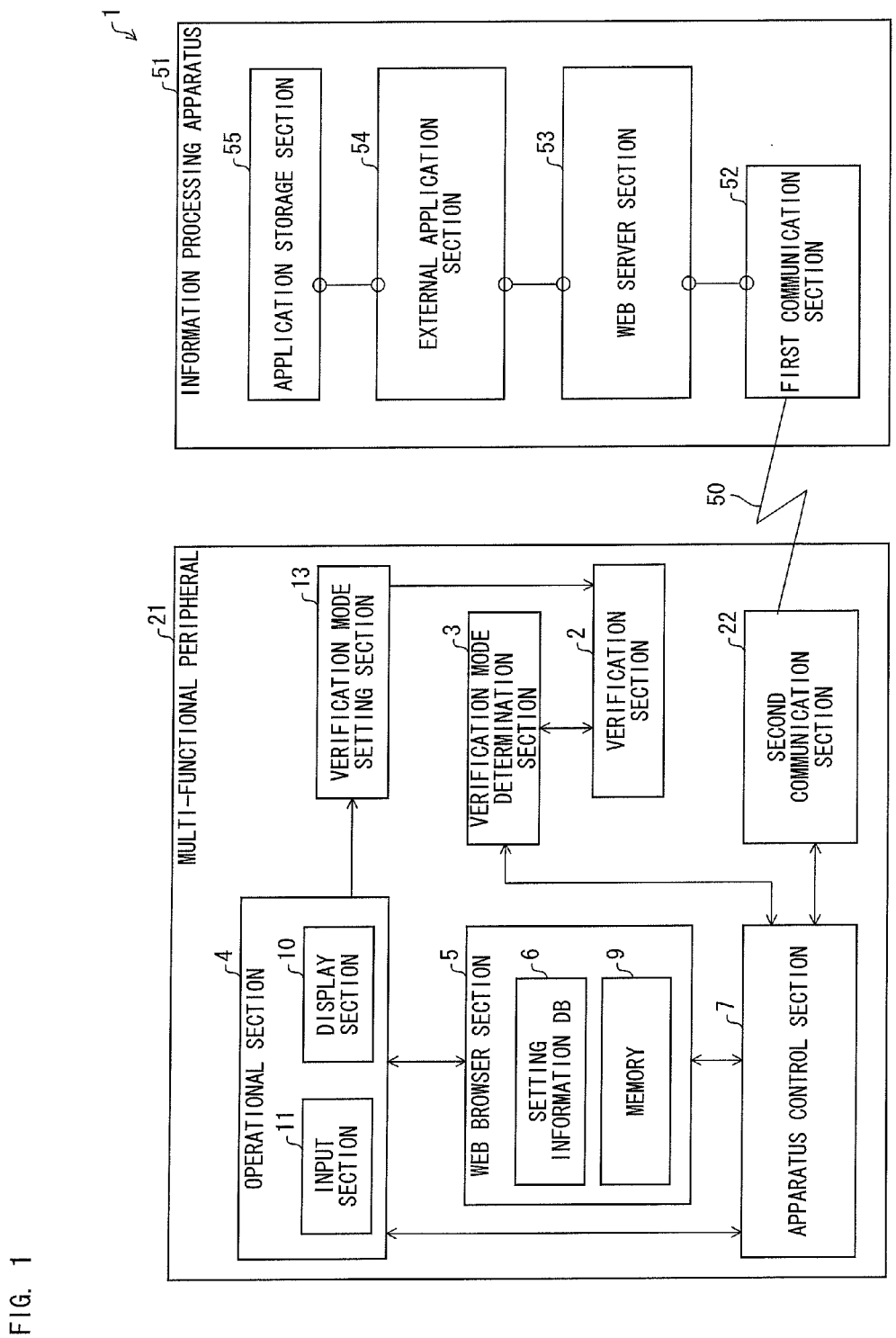
FIG. 1 is a view illustrating a configuration of a multi-functional peripheral control system including a multi-functional peripheral according to the present invention.

FIG. 1 is a view schematically illustrating a multi-functional peripheral control system 1 according to the present embodiment. As illustrated in FIG. 1, the multi-functional peripheral control system 1 according to the present embodiment includes: a multi-functional peripheral 21; and an information processing apparatus 51. These apparatuses are connected to each other over a communications network 50. Needless to say, the multi-functional peripheral control system 1 may include a plural number of the multi-functional peripheral 21, and also may include a plural number of the information processing apparatus 51.

The following communication lines may be used as the communications network 50 over which the multi-functional peripheral 21 and the information processing apparatus 51 are connected: the Internet, telephone lines, serial cables, or other communication lines either wired or non-wired. Moreover, the multi-functional peripheral 21 and the information processing apparatus 51 communicate with each other in conformity with HTTP (Hypertext Transfer Protocol) which is a protocol used in communication between a web server and a web browser (e.g., requesting and transmitting a web page).

The multi-functional peripheral 21 receives control information in an HTML (Hypertext Markup Language) format from the information processing apparatus 51, in conformity with HTTP. Thereafter, the multi-functional peripheral 21 carries out various functions of the multi-functional peripheral 21 (e.g., scanning function, printing function, communication function) in accordance with the control information received.

For instance, when the multi-functional peripheral 21 receives a piece of HTML data from the information processing apparatus 51 which HTML data is indicative of an operation screen, the multi-functional peripheral 21 causes display of the operation screen indicated by the HTML data. The multi-functional peripheral 21 then carries out, in accordance with instructions entered via the operation screen, various functions corresponding to the instructions.

Alternatively, the multi-functional peripheral 21 can execute a control command that is described by Java (registered trademark) script in the control information received from the information processing apparatus 51, to carry out various functions of the multi-functional peripheral 21 (e.g., scanning function, printing function, communication function).

The information processing apparatus 51 is a computer apparatus made up of a processing unit such as a CPU or a special purpose processor, a storage section such as a RAM, ROM, HDD or the like, and other components, and functions as a web server apparatus with respect to a plurality of multi-functional peripherals 21. As illustrated in FIG. 1, the information processing apparatus 51 includes: a first communication section 52, a web server section 53, an external application section 54, and an application storage section 55.

The first communication section 52 communicates with the multi-functional peripheral 21 via a LAN, Internet connection or like connection. Moreover, the first communication section 52 communicates with the multi-functional peripheral 21 in conformity with the HTTP communications protocol.

The web server section 53 operates in accordance with a web server software. In the embodiment, the web server is a software that provides functions of a server apparatus that make up the WWW (World Wide Web) which is an information system provided on the Internet. The web server section 53 receives a request (HTTP request) from the multi-functional peripheral 21 via the first communication section 52. The web server section 53 has a function to respond (send a HTTP response) to the multi-functional peripheral 21 via the first communication section 52, by sending files, image data, printing data, control information and like information which correspond to the HTTP request.

The external application section 54 is a block which carries out, in accordance with an instruction from the web server section 53, operations in conformity with a set web application. That is to say, the external application section 54 carries out operations in conformity with various web applications that are stored in the application storage section 55 and that are run on the web server. This web application is for instance a customized application described by Java (registered trademark) script, and is an application that runs in a Java (registered trademark) script execution environment provided on the web server.

For instance, in a case where the request from the multi-functional peripheral 21 is a transmission request of an operation screen, the external application section 54 carries out an operation in accordance with an operation screen transmitting application. More specifically, the external application section 54 generates HTML data of the operation screen that is indicated by the transmission request, and transmits this to the web server section 53.

Next described is a configuration of the multi-functional peripheral 21. As illustrated in FIG. 1, the multi-functional peripheral 21 includes: a verification section 2, a verification mode setting section (mode setting section) 13, a verification mode determination section, an operational section 4, a web browser section 5, an apparatus control section (cookie information management section) 7, and a second communication section 22.

The verification section 2 carries out a verification process for identifying a user, at a time when the user starts operating the multi-functional peripheral 21. The verification section 2 for example requests the user to enter identification information such as a login name, a password or like entry by key operation or by use of a verification card. Moreover, the verification section 2 is switchable between two verification modes: a user verification active mode in which the verification process is carried out and a user verification inactive mode in which no verification process is carried out.

The verification mode setting section 13 causes the verification modes of the verification section 2 to switch over. More specifically, the verification mode setting section 13 causes the verification mode of the verification section 2 to switch over from the user verification active mode to the user verification inactive mode, or from the user verification inactive mode to the user verification active mode, in accordance with instructions from the user entered via the operational section 4.

The verification mode determination section 3 determines whether or not the verification mode of the verification section 2 is the user verification active mode or the user verification inactive mode. Moreover, the verification mode determination section 3 transmits its determination result to the apparatus control section 7 as a verification mode determination result. The verification mode determination result is mode information indicative of whether the mode currently set is either the user verification active mode or the user verification inactive mode.

The operational section 4 is a user interface which notifies a user of information and which accepts entry by the user. The operational section 4 includes: a display section 10 such as a liquid crystal display; and an input section 11 which includes various types of input keys. The operational section 4 can be a touch panel configured so that the display section 10 and the input section 11 are combined together as one.

The web browser section 5 carries out operations in accordance with a web browser software used for many purposes. The web browser section 5 for example causes HTML data transmitted from the external application section 54 of the external information processing apparatus 51 to be displayed on the display section 10.

Moreover, the web browser section 5 includes a setting information database 6 for storing the cookie information and like information. The web browser section 5, after receiving the entered user identification information, searches whether or not the setting information database 6 stores a cookie information file that matches the identification information. Thereafter, in a case where a corresponding cookie information file is stored, the web browser section 5 reads in the cookie information and causes a memory 9 to temporally store the cookie information and the like.

Moreover, in a case where the cookie information is added to HTTP data transmitted from the information processing apparatus 51, the web browser section 5 temporally stores the cookie information in the memory 9. Thereafter, the web browser section 5, after receiving from the user a termination instruction of the web browser software, stores the cookie information which is temporally stored in the memory 9 in the setting information database 6.

The apparatus control section 7 controls various functions of the multi-functional peripheral 21. More specifically, the apparatus control section 7 controls operations of each of the sections such as the second communication section 22, the operational section 4, and the web browser section 5.

Moreover, the apparatus control section 7 manages the cookie information in accordance with a verification mode set by the verification mode setting section 13. More specifically, the apparatus control section 7, in a case where the verification mode determination result indicates the user verification inactive mode, discards the cookie information stored in the setting information database 6 after operation of the web browser section 5 is terminated. In the embodiment, "after operation of the web browser section 5 is terminated" (hereinafter referred to as "when logging out") is a concept including a time at which the operation of the web browser section 5 terminates to a time after a predetermined time has elapsed upon the termination of the web browser section 5; the predetermined time can be set as appropriate according to the security risk or the like such as leakage of personal information. That is to say, under a condition that the security risk is high, the predetermined time is set as 0 (at a time at which operation is terminated) or alternatively is set to be relatively short. On the other hand, under a condition that the security risk is low, the predetermined time may be set relatively long. This allows the user to reuse the cookie information while it is within the predetermined time. As a result, it is possible to have convenience for the user and the security management coexist.

On the other hand, in a case where the verification mode determination result indicates the user verification active mode, the apparatus control section 7 does not discard the cookie information stored in the setting information database 6 and leaves it stored in the setting information database 6.

The apparatus control section 7 has: a unique operation mode which (i) causes the display section 10 to display an operation screen unique to the multi-functional peripheral 21, which operation screen is stored in the multi-functional peripheral 21 beforehand, (ii) receives an instruction entered via the operation screen from the input section 11, and (iii) carries out control as the aforementioned in accordance with the instruction; and an external application (cooperating operation) mode which accesses an external apparatus such as an information processing apparatus 51. The unique operation mode is a general mode carried out in conventional multi-functional peripherals, and so detailed descriptions are omitted here.

The second communication section 22 is an interface for communicating with an external apparatus such as the information processing apparatus 51. In the present embodiment, as described above, the second communication section 22 communicates with the information processing apparatus 51 in conformity with HTTP.

Although not illustrated, the multi-functional peripheral 21 includes, other than the sections aforementioned: an image scanning section; an image forming section; and like sections.

The image scanning section includes a scanner and a document conveying section that conveys a document to a position of the scanner; and scans characters and images printed on the document as image data. Note that the image scanning section scans the image in a set resolution.

The image forming section prints, onto a recording sheet such as paper or the like, an image (character/photograph/graphics) corresponding to the entered image data. The image forming section includes: a photoreceptor drum; a charging device; an exposure device; a developing device; a transfer device; a fixing device; a sheet tray; and like members.

In the multi-functional peripheral control system 1 configured as above, if a function provided in the multi-functional peripheral 21 in advance is to be carried out, an operation screen stored in the multi-functional peripheral 21 is displayed on the display section 10 of the operational section 4, and the user carries out the function of the multi-functional peripheral 21 via the input section 11 of the operational section 4.

Moreover, in the multi-functional peripheral 21, in a case where the instruction entered via the input section 11 by the user is a screen acquisition request for obtaining a screen to cause the multi-functional peripheral 21 to access the information processing apparatus 51, this screen acquisition request is notified to the apparatus control section 7 via the web browser section 5. Thereafter, the apparatus control section 7 transmits the screen acquisition request from the second communication section 22 to the information processing apparatus 51.

Such a screen acquisition request from the multi-functional peripheral 21 is performed by use of Get or Post commands of HTTP, and the information processing apparatus 51 returns screen contents as a response to the screen acquisition request from the multi-functional peripheral 21. In a case where the screen contents is described in HTML, the web browser section 5 creates screen data by analyzing its contents, and causes an operation screen based on HTML to be displayed on the display section 10.

Note that applications usable by the multi-functional peripheral 21 include homepage contents on the Internet and external applications running in cooperation with the multi-functional peripheral 21.

Figure 2:
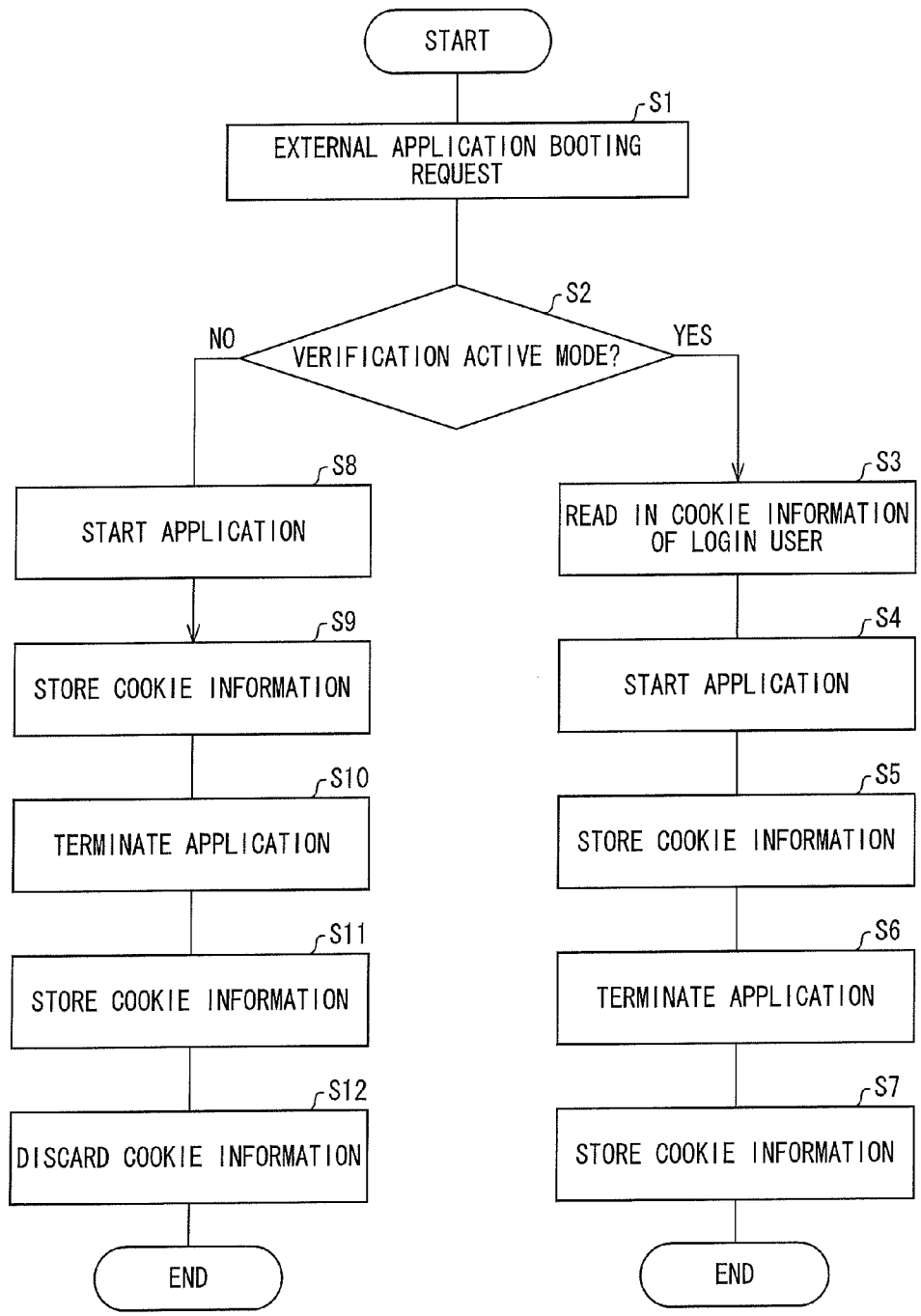
FIG. 2 is a flowchart illustrating a procedure carried out in an external application mode of a multi-functional peripheral control system according to Embodiment 1.

Next described is a series of processes carried out in the external application mode, with reference to FIG. 2. FIG. 2 is a flowchart illustrating a procedure carried out in the external application mode of the multi-functional peripheral control system 1 according to the present embodiment.

When a user selects the external application mode and an external application booting request is entered via the input section 11 (S1), the verification mode determination section 3 determines the verification mode of the verification section 2 (S2), and transmits its verification mode determination result to the apparatus control section 7.

If the verification mode determination result is the user verification active mode (YES in S2), the web browser section 5 obtains identification information such as a login name entered via the input section 11 at the time when the user starts operating the multi-functional peripheral 21. The web browser section 5, after obtaining the identification information, searches whether or not a cookie information file that matches with the identification information is stored in the setting information database 6, since there is the possibility that cookie information corresponding to that user is stored in the setting information database 6. In a case where the cookie information file of that user is stored, the web browser section 5 reads out the cookie information and stores it in the memory 9 as an identified cookie information (S3).

Figures 3, 4, 5:
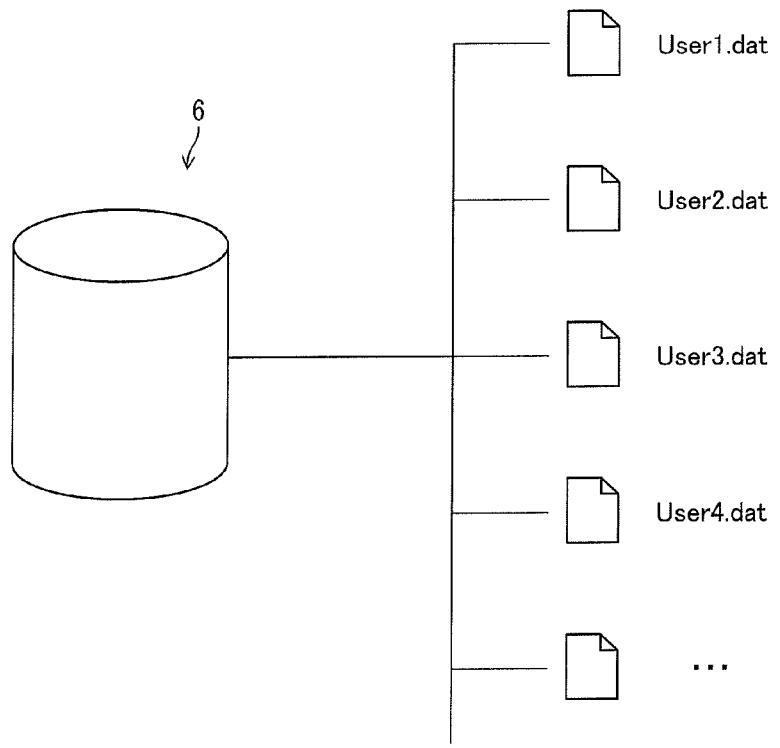
FIG. 3 is a view schematically depicting a configuration of a setting information database illustrated in FIG. 1.
FIG. 4 illustrates an example of a file of a piece of cookie information, which cookie information is stored in the setting information database depicted in FIG. 3.
FIG. 5 illustrates one example of a cookie header transmitted from a multi-functional peripheral according to the present embodiment to an information processing apparatus.

FIG. 3 is a view schematically depicting a configuration of the setting information database 6 according to the present embodiment. As illustrated in FIG. 3, the setting information database 6 manages and stores cookie information in separate files for each user based on the identification information. For instance, "user1.dat" indicates that this identification information is a setting information file of a user called "user 1".

FIG. 4 illustrates one example of a file of the cookie information stored in the setting information database 6. As illustrated in FIG. 4, the file of cookie information is made up of a pair of a name and value, and several parameters, which parameters are marked off by tabs. See for example the first row of data: the first column and second column indicate an applied range; the ".example.com" in the first column indicates a domain name, and the "/" in the second column indicates a file path. In the embodiment, the domain name ".example.com" indicates a domain name of the information processing apparatus 51. The "1 May 2010 09:10:11 GMT" in the third column indicates a term of validity; the example illustrated in FIG. 4 has the term of validity set as ten minutes and eleven seconds past nine on May 1, 2010. The "username" in the fourth column indicates a name of a key for identifying information to be stored by an application running on the web server, which "username" in the example in the first row indicate that the cookie information is a session ID. Finally, the "user1" in the fifth column indicates a value allotted to the key in the fourth column, which "user 1" in the example of the first row indicates a specific session ID.

Further, the web browser section 5 adds the identified cookie information stored in the memory 9 to the external application booting request.

FIG. 5 illustrates one example of a cookie header transmitted to the information processing apparatus 51 from the multi-functional peripheral 21 according to the present embodiment. As illustrated in FIG. 5, in the case where the identified cookie information stored in the memory 9 is added to the external application booting request, the web browser section 5 uses a cookie header. A publicly known technique of a cookie header is applicable as the cookie header. Further, the web browser section 5 transmits the external application booting request with which the identified cookie information is added to the information processing apparatus 51 via the apparatus control section 7 and the second communication section 22.

The first communication section 52 of the information processing apparatus 51 receives the external application booting request from the multi-functional peripheral 21, and transmits this to the external application section 54 via the web server section 53. Thereafter, the external application section 54 boots the corresponding application in accordance with the external application booting request, and creates HTML data. At this time, the external application section 54, in the case where the identified cookie information is added to the external application booting request, creates HTML data based on the identified cookie information. Subsequently, the external application section 54 transmits the HTML data to the multi-functional peripheral 21 via the first communication section 52 (S4). At this time, the external application section 54 creates cookie information if necessary, and transmits this to the multi-functional peripheral 21.

FIG. 6 illustrates one example of an initial operation screen based on HTML data transmitted from the information processing apparatus according to the present embodiment. The external application section 54, when receiving an external application booting request with which no identified cookie information is added, transmits to the multi-functional peripheral 21 as its response, for example HTML data of an initial operation screen as illustrated in FIG. 6, which screen requests the user to enter a login name and a password. Once the user enters the information such as the login name and password on the initial operation screen, the information is transmitted to the external application section 54 from the multi-functional peripheral 21.

In the embodiment, in a case where the user ticks an item which writes "omit entry next time on" as illustrated in the initial operation screen of FIG. 6, the external application section 54 requires to cause the web browser section 5 to store the cookie information including this information. This allows the external application section 54 to transmit the HTML data of a subsequent operation screen to the multi-functional peripheral 21 by having the cookie information attached to the HTML data.

In this case, in order to store the cookie information in the memory 9 of the web browser section 5, the external application section 54 adds a set-cookie header as a part of the HTTP header at the time of responding.

FIG. 7 illustrates one example of a set-cookie header according to the present embodiment, which is transmitted from the information processing apparatus 51 to the multi-functional peripheral 21. As illustrated in FIG. 7, the set-cookie header includes a name and its value, a term of validity and its applied range (domain name and file path name). A technique of the set-cookie header publicly known is applicable as the technique.

If the "omit entry next time on" is ticked in the initial operation screen illustrated in FIG. 6 when the application is previously used, the setting information database 6 stores the cookie information indicating the details; hence, the external application section 54 receives an external application booting request with which the cookie information is added as the identified cookie information. In this case, the external application section 54 omits transmitting the initial operation screen such as the one illustrated in FIG. 6, in accordance with the identified cookie information, and transmits data of the subsequent operation screen.

In the case where the set-cookie header is added to the HTML data transmitted from the information processing apparatus 51, the web browser section 5 records the cookie information to the memory 9 (S5), and causes the subsequent operation screen to be displayed on display section 10.

After the predetermined processes have been carried out, and the user terminates the application and enters a termination instruction of the operation of the web browser (S6), the web browser section 5 stores the cookie information stored in the memory 9 into the setting information database 6 (S7). This thus allows the user to omit carrying out the verification procedures.

In the embodiment, as described above, the setting information database 6 according to the present embodiment manages and stores the cookie information in separate files for each user. Usually, different from a personal computer, the multi-functional peripheral is assumed to be shared among an unspecified large number of users, and there is no limit in the number of users that use the multi-functional peripheral. Moreover, if the user verification function of the multi-functional peripheral is accomplished by working in cooperation with an external verification server, this number is considered to further increase. This as a result causes the total size of the cookie information files that the setting information database 6 manages and stores to increase together with the increase in the number of users. On the other hand, the size of the cookie information file that the setting information database 6 can store is limited, due to a restriction in resource available within the multi-functional peripheral 21.

Accordingly, it is preferable that the multi-functional peripheral 21 according to the present embodiment is configured so that an upper limit in the number of cookie information files that the setting information database 6 can store is set, and when the number exceeds the set upper limit, the cookie information file which has the oldest term of validity is discarded.

FIG. 8 illustrates a cookie information file management table per user, which is stored in the setting information database 6 according to the present embodiment. For instance, if the file that has the oldest term of validity is "user1" as illustrated in the cookie information file management table per user in FIG. 8, the apparatus control section 7 preferentially discards the cookie information file of "user1". This as a result allows newly creating and storing a cookie information file of a new user.

On the other hand, in a case where the verification mode determination result indicates the user verification inactive mode (NO in S2), steps S8 to S12 are carried out. In S8 to S11, processes identical to the foregoing S4 to S7 are carried out, respectively. However, in the case of the user verification inactive mode, the apparatus control section 7 discards the cookie information stored in the setting information database 6 (S12).

This as a result makes it possible to avoid security risks, such as leakage of personal information included in the cookie information. As means for discarding the cookie information, it is possible to discard the cookie information by changing the date of the term of validity of the cookie information to a date previous of a current date; namely, to a past date. Alternatively, the cookie information may be discarded by having the apparatus control section 7 directly delete the cookie information file.

In the present embodiment, in S5 and S9, the web browser section 5 stores the cookie information in the memory 9 without storing it into the setting information database 6, and thereafter stores the cookie information in the setting information database 6 in S7 and S11.

This is because, while accessing the information processing apparatus 51, if a searching process is carried out every time a page accessed is changed by accessing the cookie information files stored in the setting information database 6 each time, the time required for the process becomes long. Therefore, in the present embodiment, the web browser section 5 (i) stores, in the memory 9 at the time of starting up, the cookie information stored in the setting information database 6, (ii) updates the cookie information stored in the memory 9 if there are any update information, and (iii) stores the cookie information in the setting information database 6 when the process is terminated. However, a configuration that carries out a process of storing the cookie information into the setting information database 6 every time the cookie information is updated may also be employed.

As such, with the multi-functional peripheral 21 according to the present embodiment, in the case of the user verification active mode, the web browser section 5 stores the cookie information into the setting information database 6 when the application is terminated (i.e., when logging out). Further, when the user accesses the application again, the cookie information is automatically transmitted to the information processing apparatus 51 from the multi-functional peripheral 21. This allows the external application section 54 to identify the user. As a result, it is possible to display a screen in accordance with the cookie information which is appropriate for each respective user, such as omitting the initial operation as illustrated in FIG. 6.

On the other hand, in the case of the user verification inactive mode, the apparatus control section 7 discards the cookie information stored inside the setting information database 6, when the application is terminated (i.e., when logging out). Hence, it is possible to avoid security risks such as personal information being leaked to other users, which personal information is included in the cookie information.

As described above, the multi-functional peripheral 21 is configured so that, in accordance with the verification mode determination result, the cookie information is stored in the case of the user verification active mode, and the cookie information is discarded when logging out in the case of the user verification inactive mode. This allows achievement of the multi-functional peripheral 21 in which security risks such as the leakage of personal information are reduced.

(Modification)

The foregoing description explains a configuration in which, in the case where the verification mode determination result is the user verification inactive mode (NO in S2 of FIG. 2), the apparatus control section 7 uniformly discards, when logging out, the cookie information stored in the setting information database 6. However, the present invention is not limited to this configuration. For instance, the apparatus control section 7 can discard the cookie information in accordance with an accessing destination (domain name) or an application. Usually, a required security level varies depending on the accessing destination or the application. Hence, by discarding the cookie information in accordance with the required security level, it is possible to improve the convenience of the multi-functional peripheral control system 1. Note that the accessing destination and the application in the case where the cookie information is to be discarded is set in a program of the apparatus control section 7 and stored in advance, as discarding target information. This allows the apparatus control section 7 to refer to the discarding target information at the time of logging out, and discard the cookie information stored in the setting information database 6 in the case where the accessing destination or the used application is included in the discarding target information. Moreover, in the case where information of the application is included in the cookie information, the apparatus control section 7 may discard the cookie information in accordance with the information.

Moreover, the apparatus control section 7 may discard the cookie information in accordance with the user. As such, by discarding the cookie information in accordance with the security level requested by the user, it is possible to improve the convenience of the multi-functional peripheral control system 1. Note that a user name in the case where the cookie information is discarded is also set in a program of the apparatus control section 7 and stored in advance, as the discarding target information. As a result, the apparatus control section 7 refers to the discarding target information when logging out, and in the case where the user name is included in the discarding target information, the apparatus control section 7 discards the cookie information stored in the setting information database 6.

As described above, the multi-functional peripheral control system 1 may be configured in such a manner that in the case where the verification mode determination result is the user verification inactive mode, the cookie information is not uniformly discarded but is selectively discarded in accordance with the accessing destination, the application, or the user.

Embodiment 2

Figure 9:
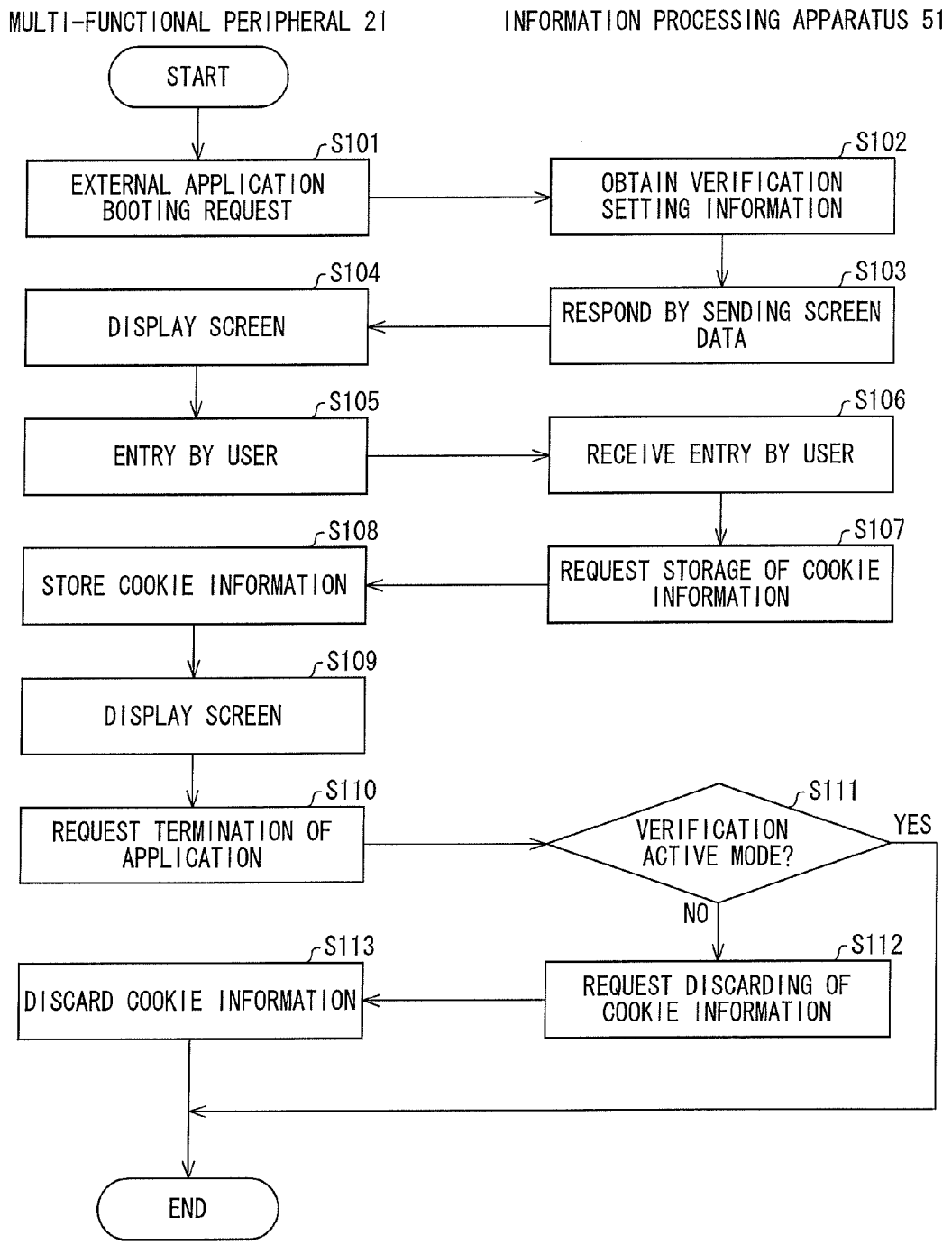
FIG. 9 is a flowchart illustrating a procedure carried out in an external application mode of a multi-functional peripheral control system according to Embodiment 2.

The following description deals with a second embodiment regarding a multi-functional peripheral 21 of the present invention, with reference to FIG. 9. The present embodiment differs from Embodiment 1 chiefly in the point that the verification mode determination result of the verification mode determination section 3 is transmitted by including the verification mode determination result in the HTTP request that is transmitted to the information processing apparatus 51 from the multi-functional peripheral 21.

FIG. 9 is a flowchart illustrating a procedure in an external application mode of a multi-functional peripheral control system according to the present embodiment. As illustrated in FIG. 9, after the user selects an external application mode, and an external application booting request is entered via the input section 11 (S101), the verification mode determination section 3 determines the verification mode of the verification section 2 and transmits a verification mode determination result to the apparatus control section 7.

In the case of the user verification active mode, the web browser section 5 obtains identification information such as a login name entered via the input section 11 at the time when the user starts to operate the multi-functional peripheral 21. Thereafter, the web browser section 5, after obtaining the identification information, searches whether or not a cookie information file that matches with the identification information is stored in the setting information database 6, and if a cookie information file of that user is stored, the web browser section 5 reads out that cookie information.

Subsequently, the web browser section 5 attaches the cookie information to the external application booting request as identified cookie information, and transmits this external application booting request to the information processing apparatus 51 via the apparatus control section 7 and the second communication section 22. At this time, the apparatus control section 7 controls the web browser section 5 so that the verification mode determination result is to be transmitted to the information processing apparatus 51 together with the external application booting request.

In the embodiment, as means for transmitting the verification mode determination result to the information processing apparatus 51, means such as adding a HTTP header of the verification mode determination result to the HTTP request may be considered, for example. That is to say, the apparatus control section 7 instructs the web browser section 5 to insert a HTTP header indicative of the verification mode determination result, into the HTTP request.

Moreover, as another means, external application section 54 of the information processing apparatus 51 may inquire of the verification mode determination result, and obtain the verification mode determination result included in its response.

The first communication section 52 of the information processing apparatus 51 receives the external application booting request and verification mode determination result from the multi-functional peripheral 21 (S102), and transmits these to the external application section 54 via the web server section 53.

The external application section 54 starts an application which corresponds to the external application booting request, and obtains HTML data. At this time, the external application section 54 modifies the HTML data of an initial operation screen to be displayed by the display section of the multi-functional peripheral 21, based on the verification mode determination result.

For example, if the verification mode determination result is the user verification active mode, the external application section 54 responds to the multi-functional peripheral 21 by transmitting HTML data of an initial operation screen in which the item "omit entry next time on" is added as illustrated in FIG. 6 (S103). On the other hand, if the verification mode determination result is the user verification inactive mode, the external application section 54 responds to the multi-functional peripheral 21 by transmitting HTML data of the initial operation screen in which the item "omit entry next time on" is excluded from the screen illustrated in FIG. 6 (S103).

Thereafter, the web browser section 5 causes the display section 10 to display the operation screen in accordance with the HTML data (S104).

Upon receiving entry of information such as the login name and password by the user via the initial operation screen (S105), the information is transmitted to the external application section 54, and the external application section 54 obtains the entered information (S106). Thereafter, the external application section 54, when it is required to have the obtained information be stored in the web browser section 5, for example when the user ticks the item "omit entry next time on" on the initial operation screen as illustrated in FIG. 6, the external application section 54 adds a set-cookie header as a part of HTML data of a subsequent operation screen, and transmits this to the multi-functional peripheral 21 (S107).

The web browser section 5, in the case where the set-cookie header is added as a part of the HTML data, stores the cookie information in the setting information database 6 (S108), and causes the display section 10 to display the subsequent operation screen (S110).

After the predetermined processes are carried out and the user terminates the application (S110), the external application section 54 determines a verification mode determination result (S111). If it is determined as the user verification active mode (YES in S111), the process is terminated. On the other hand, if it is determined as the user verification inactive mode (NO in S111), the web server section 53, in accordance with control of the external application section 54, requests the web browser section 5 to discard the cookie information (S112), and the web browser section 5 discards the cookie information stored in the setting information database 6, based on the request (S113).

As such, by transmitting the verification mode determination result from the multi-functional peripheral 21 to the information processing apparatus 51, the web browser section 5 can modify the HTML data of the operation screen to be displayed on the display section 10 of the multi-functional peripheral 21, in accordance with the verification mode determination result. Moreover, even if the web browser section 5 of the multi-functional peripheral 21 does not have means to automatically discard the setting information, it is possible to have the external application section 54 determine the verification mode based on the verification mode determination result and cause, via the web server section 53, the web browser section 5 to discard the cookie information.

As described above, it is possible to achieve, also with this present embodiment, a multi-functional peripheral 21 which is reduced in security risks such as leakage of personal information.

Embodiment 3

Figure 10:
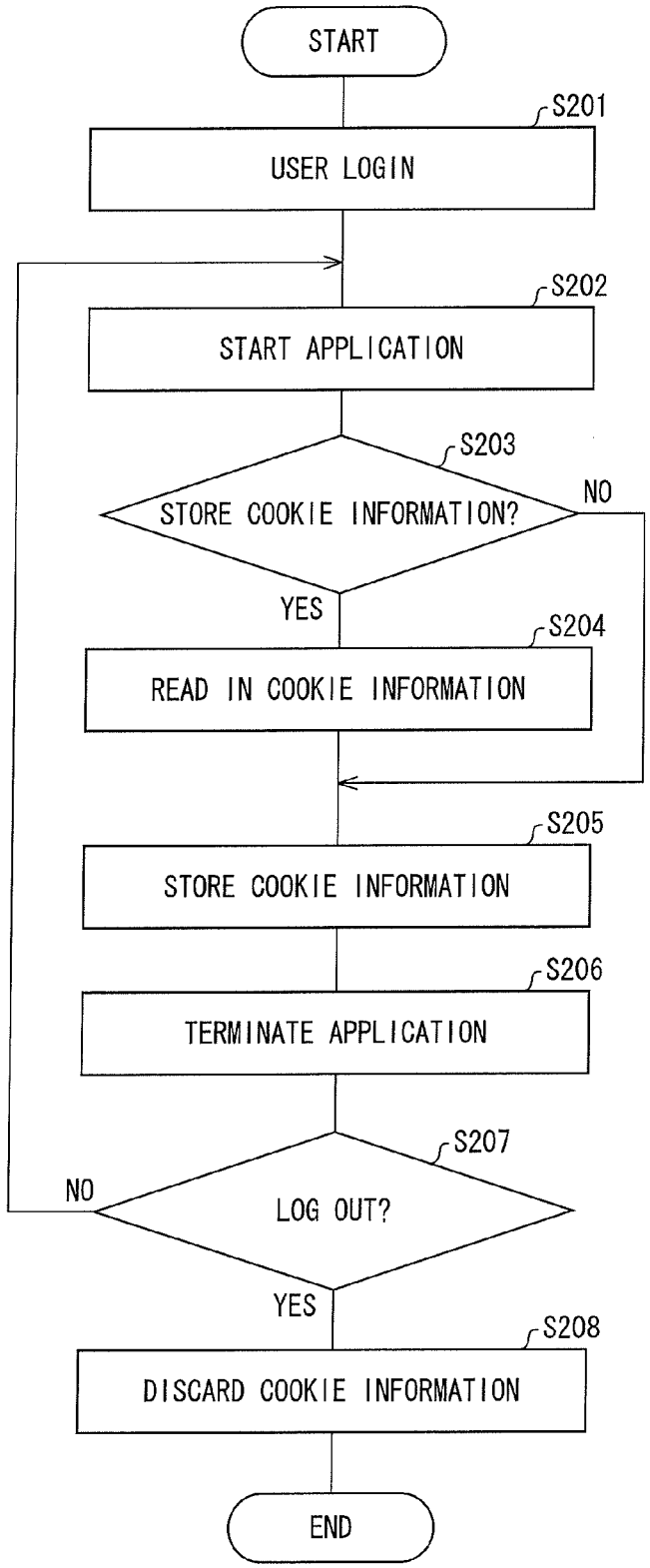
FIG. 10 is a flowchart illustrating a procedure carried out in an external application mode of a multi-functional peripheral control system according to Embodiment 3.

The following description deals with a third embodiment regarding a multi-functional peripheral 21 of the present invention, with reference to FIG. 10. The present embodiment differs from Embodiments 1 and 2 chiefly in a point that the multi-functional peripheral 21 discards cookie information when logging out even in the case of the user verification active mode.

Namely, the foregoing Embodiments 1 and 2 describe configurations in which, in the case of the user verification active mode, the multi-functional peripheral 21 stores the cookie information in the setting information database 6. However, in the case where the cookie information is stored in the setting information database 6 by user-based units, it is required to secure a sufficient amount of capacity of the setting information database 6. Furthermore, along with an increase in a stored amount of cookie information, the process of searching for cookie information that matches the entered identification information requires a long time. As a result, a problem arises that processing speed of the multi-functional peripheral 21 becomes delayed.

Accordingly, as with the present embodiment, the web browser section 5 may be configured to discard the cookie information when the user logs out, even with the user verification active mode.

FIG. 10 is a flowchart illustrating a procedure in an external application mode of a multi-functional peripheral control system according to the present embodiment, in a user verification active mode. As illustrated in FIG. 10, in the user verification active mode, the user enters identification information to log in (S201), and starts the application (S202). Moreover, searching is carried out to check whether or not cookie information corresponding to the user indicated by the identification information is stored in the setting information database 6 (S203). In the case where the cookie information is stored (YES in S203), the web browser section 5 reads out the cookie information as an identified cookie information (S204), and stores this in the memory 9. On the other hand, if the cookie information is not stored (NO in S203), the web browser section 5 omits S204.

Thereafter, the web browser section 5 carries out communication with the web server section 53 in accordance with user entry. At this time, the web browser section 5 transmits to the web server section 53 the identified cookie information read out in S204, by adding the identified cookie information to the HTTP request. This allows the external application section 54 to carry out processes based on the identified Cookie information.

Moreover, the web browser section 5, in the case where the cookie information is received from an external application section 54, updates the identified cookie information stored in the memory 9, or stores in the memory 9 the received cookie information as a new piece of cookie information (S205).

Accordingly, when the predetermined processes are carried out and the user terminates the application (S206), the web browser section 5 stores the cookie information stored in the memory 9 to the setting information database 6. Thereafter, the apparatus control section 7 determines whether or not the user has logged out (S207). In a case where the user has logged out (YES in S207) the apparatus control section 7 discards the cookie information stored in the setting information database 6 (S208), and terminates the process.

On the other hand, if the user does not log out and again starts the application (NO in S207), the processes of S202 to S207 are repeated again. At this time, the user can utilize the cookie information stored in the memory 9 and setting information database 6 of the web browser section 5. Thereafter, when the user has logged out (YES in S207), the apparatus control section 7 discards the cookie information stored in the setting information database 6 (S208), and terminates the process.

As such, discarding the cookie information even in the user verification active mode allows the reduction in size of the setting information database 6, thereby making it possible to cut down in manufacturing costs, and also to increase the processing speed of the multi-functional peripheral 21.

Furthermore, in the present embodiment, the apparatus control section 7 is configured to discard the cookie information when logging out. Hence, if the user again starts the application, the user can use the cookie information until the user logs out.

As described above, it is possible, also with this present embodiment, to achieve a multi-functional peripheral 21 which is reduced in security risks such as leakage of personal information.

Summarization of Embodiments

A multi-functional peripheral according to the embodiments communicates with an information processing apparatus over a communications network, the information processing apparatus including a web server section operating in accordance with a web server software, which multi-functional peripheral includes: a mode setting section configured to (i) receive an entry of identification information identifying a user, (ii) select a mode of either (a) a user verification active mode allowing the user to use the multi-functional peripheral after the entry of the identification information is received or (b) a user verification inactive mode allowing the user to use the multi-functional peripheral without the entry of the identification information being received, and (iii) cause the mode selected to be executed; a web browser section operating in accordance with a web browser software, configured to store cookie information received from the web server section into a storage section; and a cookie information management section configured to manage the cookie information in accordance with the mode set by the mode setting section, and in a case where the mode set by the mode setting section is the user verification inactive mode, the cookie information management section discarding the cookie information from the storage section after operation of the web browser section is terminated.

According to the configuration, in a case where the user verification inactive mode is set by the mode setting section, the cookie information management section discards the cookie information from the storage section after the operation of the web browser section is terminated. This avoids personal information included in the cookie information from leaking to other users, or the like. As a result, it is possible to achieve a multi-functional peripheral reduced in security risks such as leakage of personal information.

Moreover, the web browser section stores the cookie information received from the web server section into the storage section; this makes it possible to use various applications running on the web server, which applications operate on the premise that the cookie information is active.

Moreover, it is preferable that in the multi-functional peripheral according to the embodiments, in a case where the mode set by the mode setting section is the user verification active mode, the cookie information management section store into the storage section the cookie information received from the web server section for each user using the multi-functional peripheral at a time when the cookie information is received, and make no change to a term of validity of the cookie information.

According to the configuration, the cookie information management section, in a case where the mode set by the mode setting section is the user verification active mode, stores the cookie information received from the web server section in the storage section for each user who uses the multi-functional peripheral at the time when the cookie information is received. At this time, the cookie information management section stores the cookie information without making any changes to the term of validity of the cookie information.

As a result, in the user verification active mode, when the user accesses the web server section again before the term of validity of the cookie information ends, the cookie information stored in the storage section is read out and is transmitted to the information processing apparatus from the multi-functional peripheral. This allows the information processing apparatus to execute processes based on cookie information received from the multi-functional peripheral.

For example, in a case where login information is included as the cookie information, since the web server section of the information processing apparatus can verify the user by the cookie information, it is possible to omit the transmission of a screen for entering login information. As a result, it is possible to save the effort for the user to enter the information.

Moreover, it is preferable that in the multi-functional peripheral according to the embodiments, the web browser section notify the web server section of information indicative of whether the mode set by the mode setting section is either the user verification active mode or the user verification inactive mode.

With the configuration, the web server section can change the response data to the web browser section in accordance with the mode. For instance in the user verification inactive mode, since the cookie information is discarded, the application operating on the web server can transmit, as an HTTP response, data of a setting screen that does not include a tick box such as "keep me logged in".

Moreover, it is preferable that in the multi-functional peripheral according to the embodiments, the cookie information management section discard the cookie information from the storage section in accordance with the information processing apparatus accessed or an application used.

According to the configuration, the cookie information management section discards cookie information from the storage section in accordance with the information processing apparatus accessed or the application used. Usually, requested security levels vary depending on an accessing destination or an application, so by discarding the cookie information in accordance with the requested security level, it is possible to improve the convenience of the multi-functional peripheral control system.

Moreover, it is preferable that in the multi-functional peripheral according to the embodiments, the cookie information management section discard the cookie information from the storage section in accordance with a user using the multi-functional peripheral.

With the configuration, it is possible to improve the convenience of the multi-functional peripheral control system by discarding the cookie information on a user-basis in accordance with the security level requested by the user.

Moreover, it is preferable that in the multi-functional peripheral according to the embodiments, in a case where the cookie information of users more than a set number of users is to be stored in the storage section, the cookie information management section discard from the storage section the cookie information of a user corresponding to the cookie information having the oldest term of validity.

The multi-functional peripheral is generally placed under an environment in which the multi-functional peripheral is used by many users. Hence, in a case where cookie information is to be separately stored for each user, a required capacity of the storage section is increased in amount. However, according to the configuration, in the case where cookie information of users of more than a set number of users is stored in the storage section, cookie information of a user corresponding to cookie information having the oldest term of validity is discarded from the storage section; thus, there is no necessity to provide a storage section that has a large capacity.

This thus allows newly creating and storing a cookie information file of a new user, without increasing the capacity of the storage section provided in the multi-functional peripheral.

Moreover, it is preferable that in the multi-functional peripheral according to the embodiments, the user verification active mode allow the user to use the multi-functional peripheral from after the multi-functional peripheral receives the entry of the identification information from the user to until the user logs out, and in a case where the mode set by the mode setting section is the user verification active mode, the cookie information management section discard the cookie information from the storage section at a time when the user logs out.

In a case where cookie information is stored for each user and a plurality of users use the multi-functional peripheral, it is necessary to increase the capacity of the storage section. Moreover, such a situation causes a search for the corresponding cookie information to take a long time. However, according to the configuration, the cookie information is discarded from the storage section at a time when the user logs out even if the mode is in the user verification active mode. As a result, it is possible to reduce load given to searching the cookie information in the multi-functional peripheral. Moreover, there is no need to provide the storage section of a large capacity in the multi-functional peripheral, which allows reduction in size of the storage section and cutting down manufacturing costs. Furthermore, it is preferable that in the multi-functional peripheral according to the embodiments, the cookie information management section discard the cookie information by setting a term of validity of the cookie information to a time before a current time.

With the configuration, the cookie information can be discarded easily.

Moreover, it is preferable in the multi-functional peripheral according to the embodiments that the cookie information management section discard the cookie information by deleting the cookie information.

With the configuration, the cookie information can be discarded rapidly.

Moreover, a multi-functional peripheral control system according to the embodiments is a multi-functional peripheral control system including: an information processing apparatus including a web server section operating in accordance with a web server software; and a multi-functional peripheral communicating with the information processing apparatus over a communications network, the multi-functional peripheral including: a mode setting section configured to (i) request for entry of identification information identifying a user, (ii) select a mode of either (a) a user verification active mode allowing the user to use the multi-functional peripheral after the entry of the identification information is received or (b) a user verification inactive mode allowing the user to use the multi-functional peripheral without the entry of the identification information being received, and (iii) cause the mode selected to be executed; and a web browser section operating in accordance with a web browser software, configured to (i) store cookie information received from the web server section into the storage section and (ii) notify the web server section of mode information indicative of whether the mode set by the mode setting section is the user verification active mode or the user verification inactive mode, the web server section being configured to transmit to the web browser section an instruction to discard the cookie information from the storage section after the operation of the web browser section is terminated, in a case where the mode information received from the multi-functional peripheral is the user verification inactive mode.

According to the configuration, in the case where the multi-functional peripheral is set in the user verification inactive mode by the mode setting section, the web browser section discards the cookie information from the storage section after the operation of the web browser section is terminated, in accordance with an instruction transmitted from the web server section of the information processing apparatus to discard the cookie information. This as a result allows avoiding the personal information included in the cookie information from leaking to other users, and the like.

Hence, it is possible to achieve a multi-functional peripheral reduced in security risks such as leakage of personal information.

The multi-functional peripheral may also be attained by a computer. In this case, a program that causes a computer to attain the multi-functional peripheral by causing the computer to carry out each of sections of the multi-functional peripheral, and a computer-readable recording medium recording such a program are also within the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks of the multi-functional peripheral 21 and information processing apparatus 51 may be realized by way of hardware or software as executed by a CPU as follows:

The multi-functional peripheral 21 and information processing apparatus 51 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the multi-functional peripheral 21 and information processing apparatus 51 a computer-readable storage medium containing control program code (executable program, intermediate code program, or source program) for the multi-functional peripheral 21 and information processing apparatus 51, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The multi-functional peripheral 21 and information processing apparatus 51 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

INDUSTRIAL APPLICABILITY

The present invention is applicable to a multi-functional peripheral which achieve a plurality of functions such as copying, scanning, and sending a facsimile.

REFERENCE SIGNS LIST 1 multi-functional peripheral control system
2 verification section
3 verification mode determination section
4 operational section
5 web browser section
6 setting information database (storage section)
7 apparatus control section (cookie information management section)
9 memory
10 display section
11 input section
13 verification mode setting section
21 multi-functional peripheral
22 second communication section
50 communications network
51 information processing apparatus
52 first communication section
53 web server section
54 external application section
55 application storage section

What is claimed is:

1. A multi-functional peripheral programmed to communicate with an information processing apparatus over a communications network, the information processing apparatus including a web server section operating in accordance with a web server software, the multi-functional peripheral comprising:
a mode setting section programmed to (i) request for an entry of identification information identifying a user, (ii) select a mode of either (a) a user verification active mode allowing the user to use the multi-functional peripheral after the entry of the identification information is received or (b) a user verification inactive mode allowing the user to use the multi-functional peripheral without the entry of the identification information being received, and (iii) cause the mode selected to be executed;
a web browser section programmed to operate in accordance with a web browser software, configured to store cookie information received from the web server section into a storage section; and
a cookie information management section programmed to manage the cookie information in accordance with the mode set by the mode setting section, and in a case where the mode set by the mode setting section is the user verification inactive mode, the cookie information management section discarding the cookie information from the storage section after operation of the web browser section is terminated.

2. The multi-functional peripheral according to claim 1, wherein:
in a case where the mode set by the mode setting section is the user verification active mode, the cookie information management section stores into the storage section the cookie information received from the web server section for each user using the multi-functional peripheral at a time when the cookie information is received.

3. The multi-functional peripheral according to claim 2, wherein:
the cookie information management section makes no change to a term of validity of the cookie information at a time when storing the cookie information into the storage section.

4. The multi-functional peripheral according to claim 1, wherein:
the web browser section notifies the web server section of information indicative of whether the mode set by the mode setting section is either the user verification active mode or the user verification inactive mode.

5. The multi-functional peripheral according to claim 1, wherein:
the cookie information management section discards the cookie information from the storage section in accordance with the information processing apparatus accessed or an application used.

6. The multi-functional peripheral according to claim 1, wherein:
the cookie information management section discards the cookie information from the storage section in accordance with a user using the multi-functional peripheral.

7. The multi-functional peripheral according to claim 1, wherein:
in a case where the cookie information of users more than a set number of users is to be stored in the storage section, the cookie information management section discards from the storage section the cookie information of a user corresponding to the cookie information having the oldest term of validity.

8. The multi-functional peripheral according to claim 1, wherein:
the user verification active mode allows the user to use the multi-functional peripheral from after the multi-functional peripheral receives the entry of the identification information from the user to until the user logs out, and
in a case where the mode set by the mode setting section is the user verification active mode, the cookie information management section discards the cookie information from the storage section at a time when the user logs out.

9. The multi-functional peripheral according to claim 1, wherein:
the cookie information management section discards the cookie information by setting a term of validity of the cookie information to a time before a current time.

10. The multi-functional peripheral according to claim 1, wherein:
the cookie information management section discards the cookie information by deleting the cookie information.

11. A multi-functional peripheral control system comprising:
an information processing apparatus including a web server section operating in accordance with a web server software; and
a multi-functional peripheral programmed to communicate with the information processing apparatus over a communications network,
the multi-functional peripheral comprising:
a mode setting section programmed to (i) request for an entry of identification information identifying a user, (ii) select a mode of either (a) a user verification active mode allowing the user to use the multi-functional peripheral after the entry of the identification information is received or (b) a user verification inactive mode allowing the user to use the multi-functional peripheral without the entry of the identification information being received, and (iii) cause the mode selected to be executed; and
a web browser section programmed to operate in accordance with a web browser software, configured to (i) store cookie information received from the web server section into the storage section and (ii) notify the web server section of mode information indicative of whether the mode set by the mode setting section is the user verification active mode or the user verification inactive mode,
the web server section being programmed to transmit to the web browser section an instruction to discard the cookie information from the storage section after the operation of the web browser section is terminated, in a case where the mode information received from the multi-functional peripheral is the user verification inactive mode.

12. A non-transitory computer-readable storage medium in which a program is stored, the program being for causing a computer to function as each of sections of a multi-functional peripheral as set forth in claim 1.

* * * * *